Sept. 20, 1949.   W. DZUS   2,482,729
MILLING MACHINE
Filed Dec. 2, 1943   5 Sheets-Sheet 2
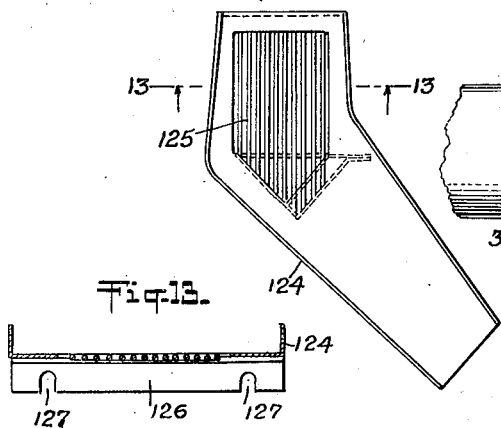
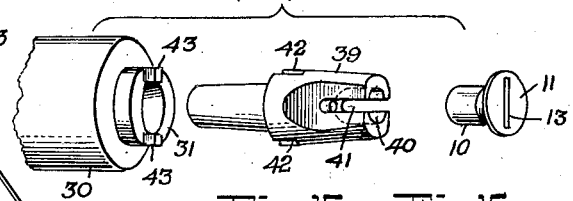
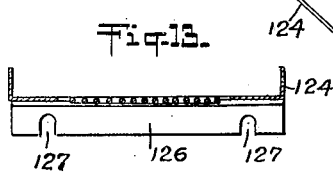
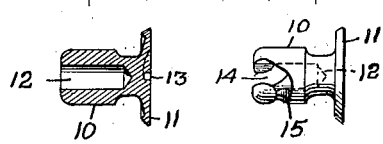
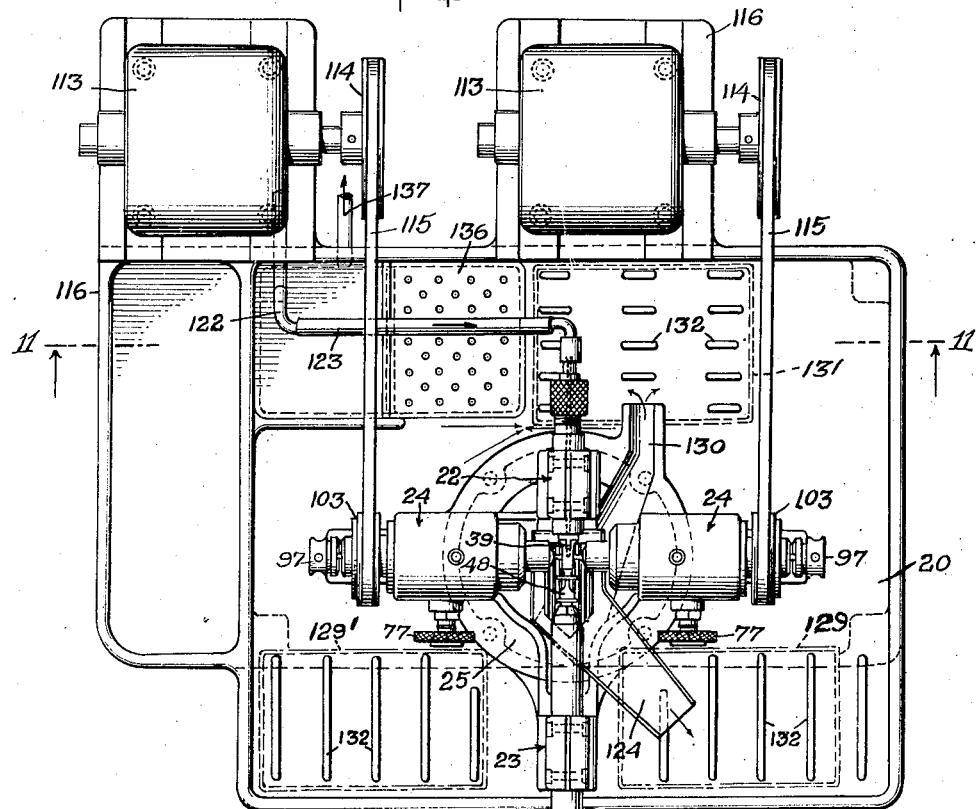
INVENTOR.
William Dzus

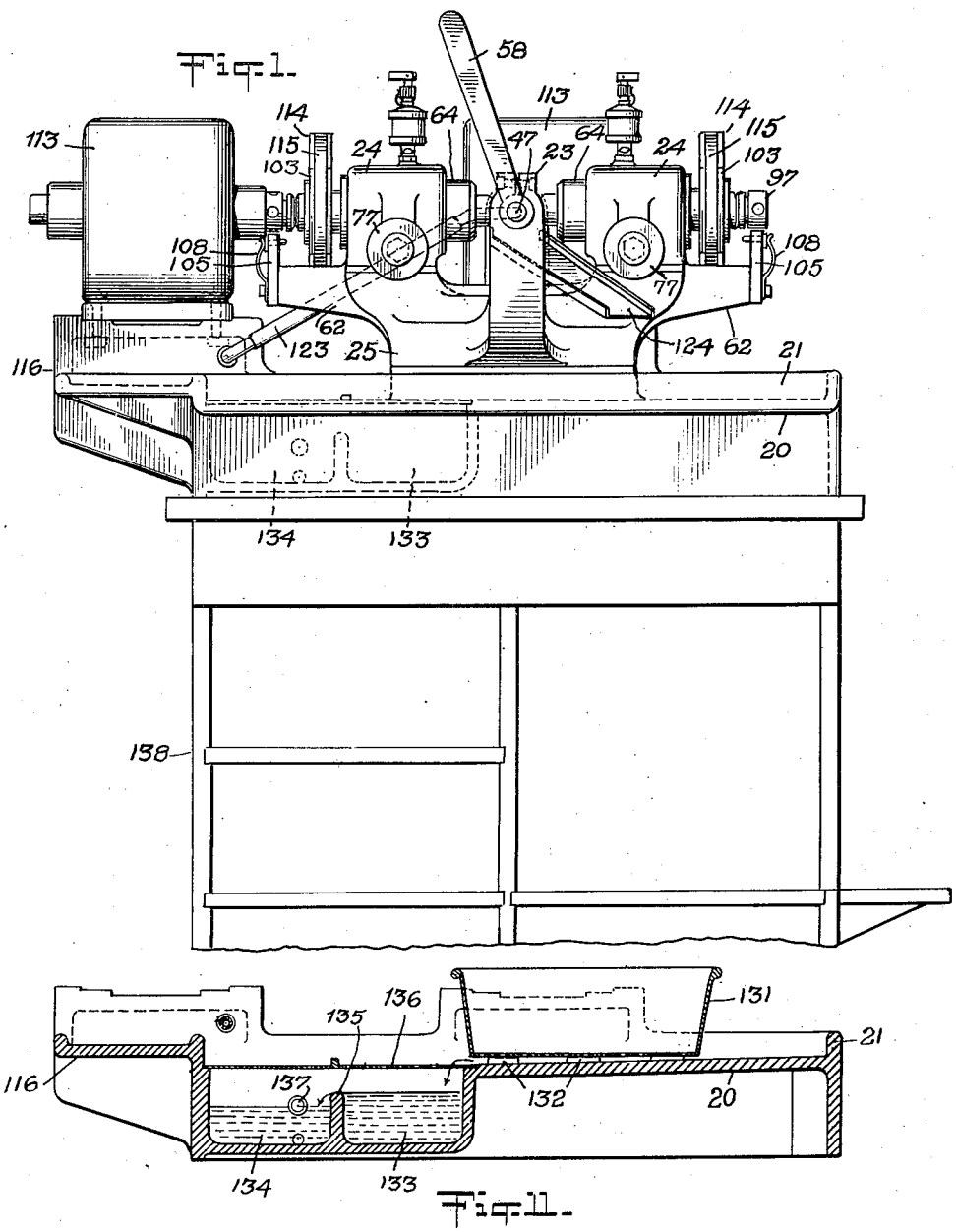

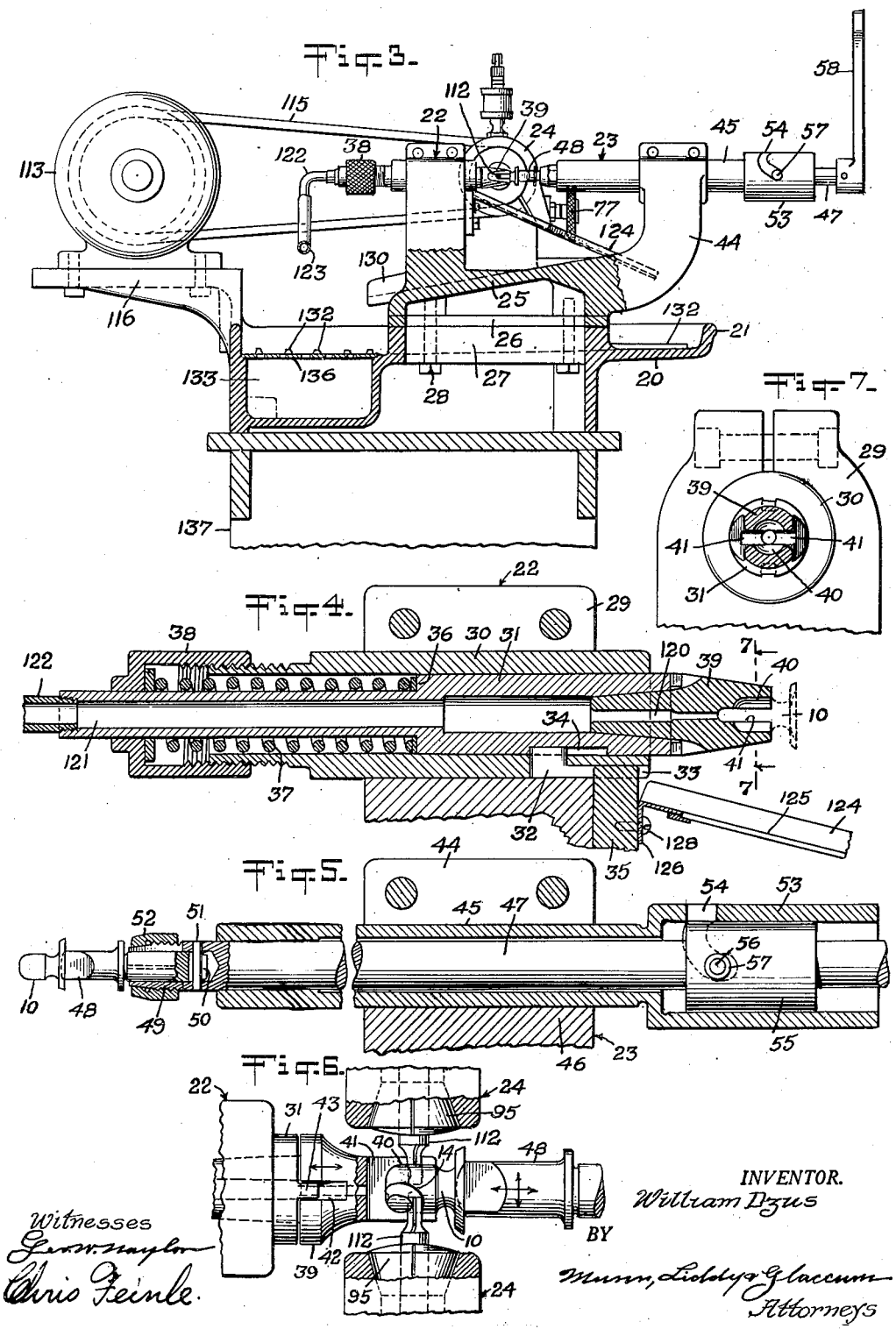

Sept. 20, 1949.                    W. DZUS                    2,482,729
                              MILLING MACHINE
Filed Dec. 2, 1943                                        5 Sheets-Sheet 4
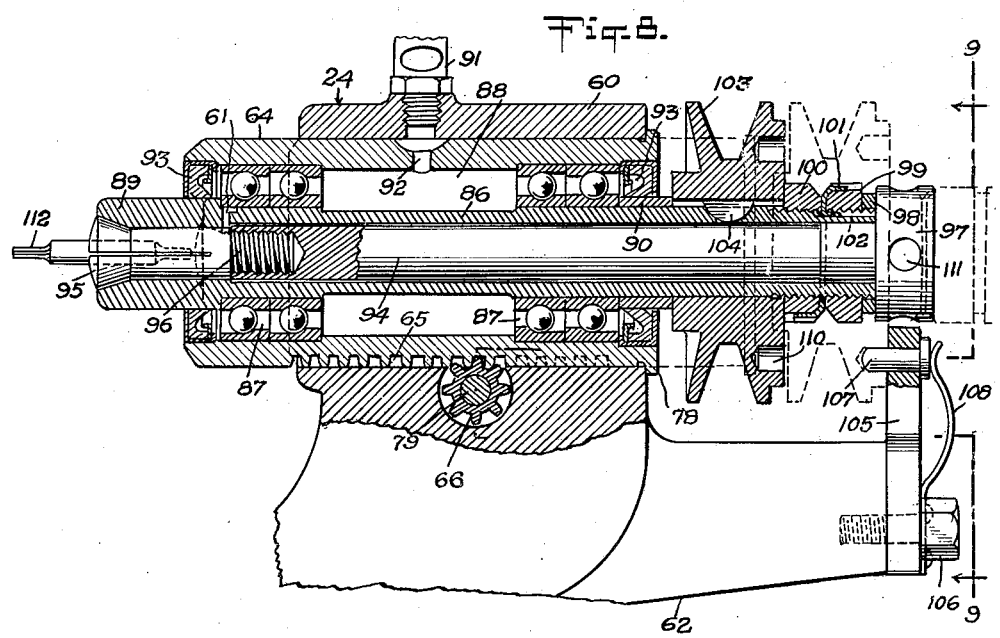
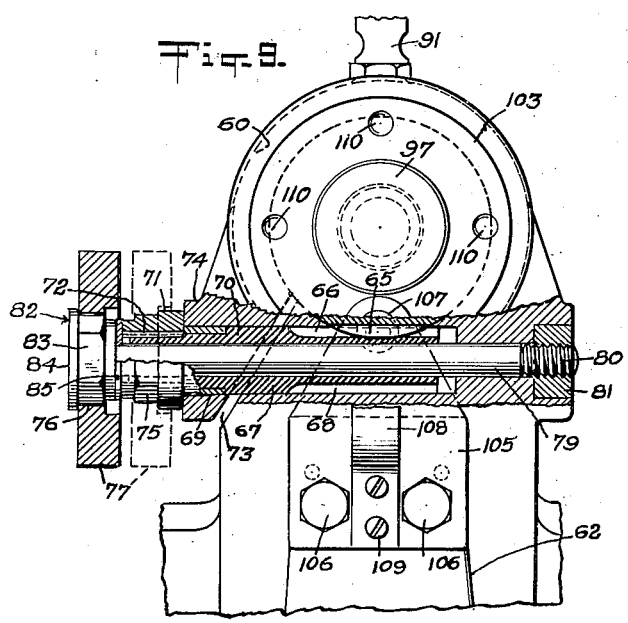
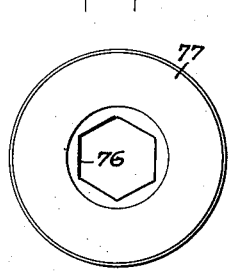
INVENTOR.
William Dzus
BY
Munn, Liddy & Glaccum
Attorneys Sept. 20, 1949.  W. DZUS  2,482,729
MILLING MACHINE
Filed Dec. 2, 1943  5 Sheets-Sheet 5
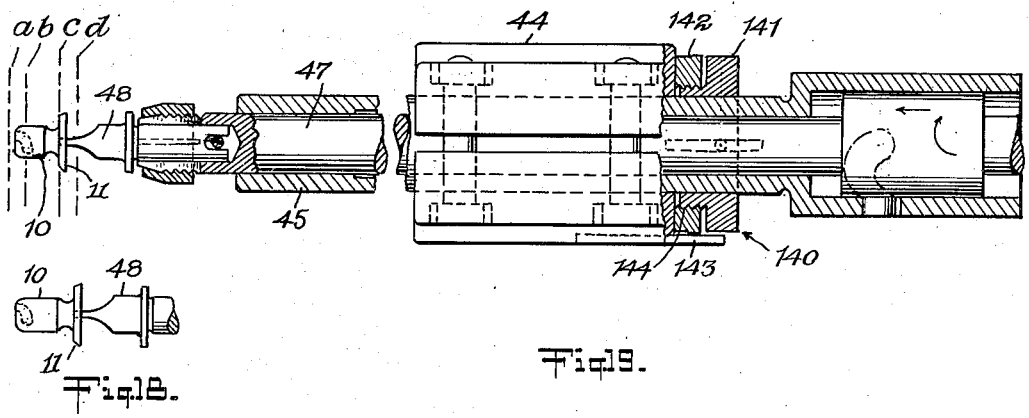
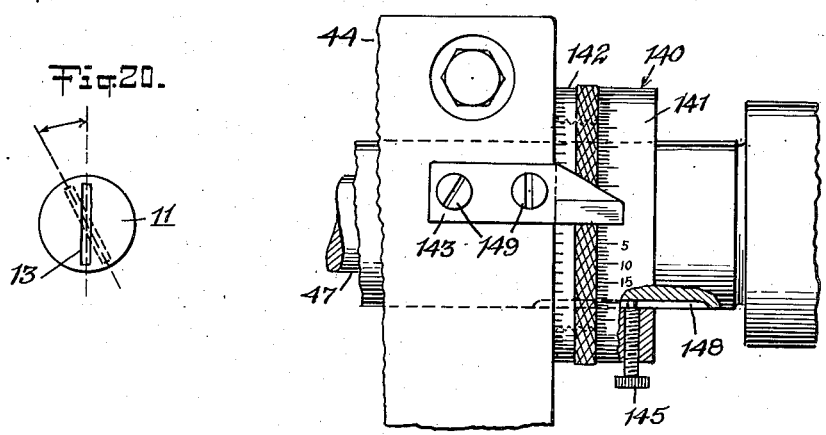
INVENTOR.
William Dzus
BY
Munn, Liddy & Glaccum
Attorneys Patented Sept. 20, 1949

2,482,729

UNITED STATES PATENT OFFICE 2,482,729

MILLING MACHINE

William Dzus, West Islip, N. Y.

Application December 2, 1943, Serial No. 512,563

4 Claims. (Cl. 90—11)

1

This invention relates to improvements in milling machines and more particularly to machines which may be used advantageously for producing slotted and grooved work, such for instance, as the slotting or grooving of fastener elements.

An object of the invention is the provision of an improvement in a machine of the indicated character, whereby to facilitate the insertion, removal, replacement and locking of the cutters whenever necessary or desired, and so that these operations, and others, may be readily carried out by women as well as men operators.

A further object is the provision of an improvement in a machine of the indicated character, whereby the cutter driving means is prevented from operating during removal and replacement of a cutter, as a safety precaution.

A further object is the provision of improvements in a machine of the indicated character, whereby to lubricate the cutters and work during the operation of the machine in such manner that the lubricant will be effectually separated from the millings and chips, to the end that the lubricant will be constantly reused for facilitating the milling operation until a change of lubricant is necessary, while the millings and chips are left readily accessible as scrap.

A further object is the provision of improvements in a machine of the indicated character which lend themselves to the efficient and expeditious operation of the machine; which enable adjustments and conversions for accommodating work of various sizes; and which conserve floor space and yet afford places for finished and unfinished work, tools and other accessories.

With the foregoing, other objects of the invention will appear when the following specification is read in conjunction with the accompanying drawings, in which—

Fig. 1 is a front view of a machine embodying the features of the invention, the machine being supported on any suitable structure at the desired elevation, it being shown on a stand, a portion of which is broken away;

Fig. 2 is a top plan view;

Fig. 3 is a side view with certain features shown in section;

Fig. 4 is an enlarged vertical sectional view of the work guide;

Fig. 5 is an enlarged vertical sectional view of the feed stock, portions thereof being broken away;

Fig. 6 is a fragmentary top plan and part sectional view of parts of the work guide, feed stock and opposed milling heads;

2

Fig. 7 is a sectional view taken on the line 7—7 of Fig. 4;

Fig. 8 is a vertical longitudinal sectional view of one of the milling heads;

Fig. 9 is a sectional view taken on the line 9—9 of Fig. 8 and looking in the direction indicated by the arrows;

Fig. 10 is a face view of the actuator constituting a part of each milling head;

Fig. 11 is a sectional view taken on the line 11—11 of Fig. 2 and showing the primary strainer tray in use in conjunction with the secondary lubricant separation means;

Fig. 12 is a top plan view of the chute for separating the lubricant and fine millings from the work and large chips;

Fig. 13 is an enlarged sectional view taken on the line 13—13 of Fig. 12;

Fig. 14 is a collective view of parts of the work guide and a rudimentary fastener in perspective;

Fig. 15 is a longitudinal sectional view of an unfinished or rudimentary fastener element;

Fig. 16 is a side view of the fastener element finished or slotted by the machine;

Fig. 17 is a sectional top plan view of the feed stock, portions being broken away, and showing a vernier to enable the adjustment of the screw driver at the desired angle and distance with respect to the work for an accurate setup in the operation of the machine;

Fig. 18 is a view of a longer fastener element and the screw-driver, said longer element requiring axial adjustment of the screw-driver;

Fig. 19 is an enlarged side view of the vernier and parts with which it cooperates;

Fig. 20 is a view to indicate what is meant by angular adjustment of the screw driver for changing relation of the kerf in the fastener element with respect to the inner terminii of the slots; and Figs. 21 and 22 are views of the main parts of the vernier detached.

Referring now more particularly to Fig. 15, it will be apparent there is shown a rudimentary or unfinished piece of work in the form of a stud fastener element, consisting of a shank 10 having a head 11 on one end. The shank 10 has a bore 12 therein extending longitudinally thereof, and said bore opens through the end of the shank opposite that having the head 11. The shank 10 is therefore of tubular construction. The head 11 has a kerf 13 therein for the purpose of turning the fastener element. The finished piece of work or fastener element is shown in Fig. 16. The shank 10 of this product has spiral slots 14 opposite each other. One wall of each slot 14 has a projection or hump 15. The slots 14 are designed and arranged to receive a cooperative spring fastener element. The projections 15 serve for the purpose of resisting retrograde rotation to prevent unintentional separation of the interengaged elements.

The machine of the present invention may be used for slotting the rudimentary fastener elements to produce the finished articles. It is to be understood the machine is not limited to the aforesaid use, but may be put to any and all other uses for which it is suited.

The machine includes a base or bed plate 20 having an upstanding flange 21 all around its outer edge. Above the plate 20 are arranged a work guide 22, a feed stock 23, and a pair of opposed milling heads 24. In the present instance, these elements 22, 23 and 24 are all mounted on a hollow pedestal 25 which rests upon a resilient cushion 26 of cork or the like, which cushion, in turn, rests upon an annular upstanding seat 27 disposed approximately centrally of the bed plate 20, as shown most clearly in Fig. 3. The pedestal 25 is secured to the seat 27 by bolts.

The work guide 22, which is shown most clearly in Fig. 4, includes a clamp bearing 29 rising from the pedestal 25 and integral therewith. A sleeve 30 is mounted in the bearing 29 in fixed position in a fore and aft direction. A slide 31 is arranged in the sleeve 30 for axial movement in opposite directions and is prevented from rotational movement by a key 32 engaged in a slot 33 and a groove or key-way 34 in the sleeve 30 and slide 31, respectively. A block 35 is bolted to the bearing 29 and its upper end projects into the slot 33. The block 35 thus serves as a key to aid the bearing 29 in fixing the sleeve 30 in proper position. The key 32 and key-way 34 serve to limit the axial movement of the slide 31 in opposite directions in accordance with the required slots 14. The slide 31 is reduced in diameter to provide a shoulder 36. A coil spring 37 is arranged within the sleeve 30 and surrounds the reduced portion of the slide 31. One end of the spring 37 bears on the shoulder 36 and its opposite end bears on a tension adjusting nut 38 in threaded engagement with the sleeve 30. The spring 37 thus employed serves to cause the return or reverse movement of the slide 31. A work holder or chuck 39 is adapted for detachable articulation with the front end of the slide 31 so as to move axially therewith but prevented from turning with respect thereto. The chuck 39 consists of a body having a coaxial cavity 40 in its work-receiving end. Said end of the chuck has side openings or slots 41 arranged diametrically opposite each other and which communicate with said cavity 40. The other end of the chuck body is conical and loosely although snugly fits in a similarly shaped bore in the slide 31. The chuck 39 has rearwardly opening notches 42 arranged diametrically opposite each other which receive lugs 43, respectively, on the front end of the slide 31 to prevent the chuck from turning with respect to the slide. The chuck is therefore detachable. The cavity 40 is so formed as to receive the shank of a rudimentary fastener element as shown in Figs. 14 and 15 with the head of the element projecting from the cavity, as indicated in Fig. 4. The fastener element or work piece is supported by the chuck to move axially therewith and to be turned with respect thereto. The openings or slots 41 are positioned to receive rotary material-removing cutters of the opposed heads 24.

The feed stock 23 is for simultaneously moving the work axially in one direction and turning it in one direction, and then permitting the reverse movement of the work, as supported by the chuck 39 and guided by the slide 31. In other words, the machine tool 23 serves to feed or spirally drive the work to the cutters. The device 23 is best shown in Fig. 5 and includes a clamp bearing 44 integral with the pedestal 25. A guide sleeve 45 is clamped by the bearing 44 in the required fixed position. A shaft 47 is supported by the sleeve 45 in axial alinement with the chuck 39. The shaft 47 has axial and turning movement with respect to the sleeve 45. The inner end of the shaft 47 carries a screw driver 48. The said inner end of the shaft 47 is split and formed to provide a collet 49. The inner end of the screw driver is bifurcated to provide a transverse slot 50. The shaft carries a transverse pin 51. The slotted end of the screw driver 48 is inserted into the collet 49 with the pin 51 disposed in the slot 50. A tightening nut 52 constituting a part of the collet 49, serves to secure the screw driver 48 to the shaft 47. The pin 51 aids in preventing the screw driver 48 from turning with respect to the shaft 47. Thus, the position of said edge is known and facilitates its engagement with the kerf 13 in the work piece. The sleeve 45 has an enlarged portion 53 on its outer end which has a slot 54. The slot 54 is spiral with respect to the axis of the shaft 47. The portion 53 with its slot 54 constitutes a pattern cam to govern the movement of the shaft 47 and the screw driver carried thereby. The shaft 47 has an enlargement 55 which moves in the sleeve portion 53 and said enlargement 55 carries a radial stud 56 on which is mounted a roller 57 disposed in the slot 54 and cooperating with the walls of the latter. The shaft 47 has a handle 58 on its outer end for the purpose of pushing and turning the shaft subject to the action of the pattern cam. Thus, the screw driver 48 may be caused to move axially toward the chuck 39 and turn a predetermined distance, and also to move axially in the opposite direction and turn a predetermined distance as the shaft 47 is turned one quarter of a revolution while moving axially.

The milling heads 24 are opposed to each other. Since these heads 24 are identical, a description of one will suffice for both. Such head, shown most clearly in Figs. 8 and 9, includes a clamp bearing 60 rising integrally from the pedestal 25. A sleeve 64 is supported by the bearing 60 for axial movement in opposite directions. The sleeve 64 has a gear rack 65 which meshes with a gear 66 forming a part of a hollow shaft 67 extending into a transverse bore 68 in the bearing 60. A bushing 69 tightly fitted to the wall of the bore 68 abuts a shoulder 70 of the shaft 67. A collar 71 is keyed fast to the outer end of the shaft 67, as at 72. The bearing 60 has a split 73 to provide a clamping portion 74 which cooperates with the main portion of the bearing to set up the clamping action on the sleeve 64. The collar 71 bears on the portion 74. The shaft 67 is prevented from moving axially by the bushing 69 and collar 71 but permit it to be rotated. The collar 71 has external flats 75 which correspond to the internal flats 76 of a separate actuator disk or the like 77. This disk 77 may be engaged with the collar 71 to cause the rotation of the shaft 67 when the sleeve 64 is unclamped by the bearing 60. Upon rotation of the shaft 67, and through the intervention of the rack 65 and gear 66, the sleeve 64 may be caused to move axially between an advanced milling position and a retracted non-milling position. The sleeve 64 has a flange 78 which limits the movement thereof to the advanced position. In order to clamp the sleeve 64 in position there is provided a clamping bolt 79 which extends through the hollow shaft 67. The threaded end 80 of the bolt is screwed into a nut 81 fixed to the bearing 60 in a recess therein. The bolt 79 has a head in the form of a nut 82, since said head has flats 83. The head 82 also has a flange 84. The flats 83 correspond to the flats 76 of the disk 77 so that the disk 77 may be brought into engagement with the head 82 for the purpose of rotating the bolt 79. A washer 85 is interposed between the collar 71 and the head 82. When the actuator disk 77 is engaged with the head 82 it may be rotated to cause the axial movement of the bolt 79 in one direction to cause pressure to be exerted on clamping portion 74 through the intervention of the parts 82, 85 and 71 to clamp the sleeve 64 in fixed position to which it has been previously moved. By rotating the disk 77 in the opposite direction, the bolt 79 will be moved axially in a reverse direction, thereby releasing the pressure with the result that the sleeve 64 will be unclamped and free to be moved by means of the parts 77, 71, 67, 66 and 65.

The milling head also includes a hollow spindle 86 whose external diameter is smaller than the internal diameter of the sleeve 64. The spindle 86 extends coaxially of the sleeve 64 and is supported for rotation by roller bearings 87, there being a pair of such bearings at each end of the sleeve 64, and said pairs are in spaced relation to provide a space 88 for lubricant. The spindle 86 is held against axial movement with respect to the sleeve 64 by the enlarged inner end 89 of the spindle which contacts one of said bearings 87, and a collar 90 fixed on the spindle 86 and in contact with another of the bearings 87. Lubricant flows from a cup 91 carried by the bearings 60, through a port 92 into the space 88 to lubricate the bearings 87. Ring packing or gaskets 93 seal the ends of the sleeve 64 around the spindle to prevent leakage of the lubricant. An arbor 94 extends into the spindle 86 coaxially thereof. A conical collet 95 has a screw portion 96 in threaded engagement in a tapped socket in the inner end of the arbor 94. A lock pin 61 carried by the spindle 86 projects into a longitudinal groove in the collet 95 to prevent the latter from turning with relation to the spindle. The collet 95 cooperates with the conical end 89 of the spindle 86 in effecting the opening and closing of the collet. A head 97 integral with the outer end of the arbor 94 bears on the outer end of the spindle 86 and also on a washer 98 which in turn bears on a lock nut 99 on the spindle. A second lock nut 100 on the spindle cooperates with the nut 99 to hold a lock washer 101 between them. The washer has a key engaged in a groove 102 in the spindle. A grooved pulley 103 is keyed fast to the spindle 86, as at 104. The nuts 99 and 100 cooperate with the collar 90 to aid in holding the pulley fixed to the spindle. The pulley 103 serves to transmit the power torque to the spindle 86 and the arbor 94 and its collet 95.

In order to hold the spindle from rotating so that the arbor 94 may be turned to open and close the collet 95 when the spindle is in the retracted position, there is provided means as follows. An upstanding bracket or rigid support 105 is fixed to a lateral arm 62 integral with the pedestal 25 by securing elements 106. A headed stop pin 107 extends loosely through the bracket, the latter having a transverse hole therein for that purpose. A leaf spring 108 has the lower end thereof secured to the bracket by screws 109 and the upper end of the spring 108 bears on the head end of the pin 107. The pulley 103 has a plurality of holes 110 therein, each opening through the outer side face thereof. The holes 110 are so positioned that the pin 107 may be entered into any one of the holes when the spindle assembly is in the retracted position, as indicated in dotted lines in Fig. 8. This will prevent turning of the spindle 86, although the arbor may be turned relatively to spindle. The head 97 has radial holes 111 to receive a handle bar for the purpose of turning the arbor. By turning the arbor 94 counter-clockwise, the collet 95 will be moved axially out of the engagement with the conical end 89, due to the screw 96, thereby opening the collet and releasing a milling cutter 112. A clockwise turning of the arbor will close the collet 95 to grip the cutter 112 as will be understood. By engaging the actuator disk 77 with the collar 71, the spindle assembly may be moved axially in the manner set forth hereinabove, to either the advanced position in which the cutter may perform its material removing operation, or be moved to the retracted position for the insertion and replacement of the cutter. The provision of the means to prevent rotation of the spindle while inserting and replacing a cutter also serves as a safety precaution.

The cutters 112 of the opposed heads 24 are in axial alinement with respect to each other and lie in the plane of the axes of the chuck 39 and the screw driver 48, and at a right angle with respect thereto. The cutters 112 are received in the slots 41, respectively, of the chuck 39 when the spindle assemblies of the heads 24 are in the advanced position.

The pulley 103 of each head 24 is driven by means of any electric motor 113 through the intervention of a grooved pulley 114 on the motor shaft and a belt 115 which encircles the pulleys 103 and 114. Separate motors are provided since it is preferred to use identical cutters. Obviously, the cutters 112 are rotated in opposite directions. Each motor is supported on a bracket 116 integral with the bed plate 20. By adjusting the position of each motor, the belt may be tightened or loosened for proper operation.

A system is provided whereby the cutters and the work are lubricated, and whereby the work is separated from the lubricant and the lubricant is strained to free or separate the same from the millings and chips, during the operation of the machine. In accordance therewith, the chuck 39 has a longitudinal passage 120 therein which communicates with the slots or side openings 41 and a passage 121 extending through the slide 31. A conduit 122 is connected with the outer end of the slide 31 by suitable fittings and said conduit includes a flexible section 123 which compensates for the axial movement of the slide 31. The conduit 122 leads to a suitable pump which draws the lubricant or oil from a sump, said pump and the sump being omitted from the drawings. The oil is fed through the conduit 122, slide 31 and chuck 39 to bathe the cutters 112 and the work piece. The oil passes out of the openings 41 and, together with millings and small chips, fall through a chute 124 which has slots or other openings 125 for that purpose. The chute is of angular formation and has a depending flange 126 with notches 127. Screws 128 are received in the notches 127, respectively, and secure the chute to the block 35 so that the chute is disposed directly beneath the chuck 39, as shown in Fig. 4. The finished piece of work is dropped into the chute 124 which delivers it to a suitable receptacle 129, indicated in dot-and-dash lines in Fig. 2. The large chips, if any, also are delivered by the chute into the receptacle 129. A similar receptacle or tray 129', indicated in dot-and-dash lines in Fig. 2, holds the new work. These receptacles are at the front of the machine.

As stated, the oil and millings pass through the openings 125 in the chute. An inclined trough 130 formed in the pedestal 25 catches the oil and millings and conveys the same to a receptacle or tray having a strainer bottom. This tray is indicated in dotted lines in Fig. 2 and also appears in full lines in Fig. 11 and is designated 131. The receptacle rests on ribs 132 on the upper surface of the bed plate 20. The ribs 132 serve as spacing means to hold the receptacle elevated so that the oil may flow through the bottom while millings are retained in the receptacle. The oil leaving the receptacle 131 passes into a separation receptacle subdivided into two compartments 133 and 134, respectively, by an overflow partition 135. A strainer 136 is seated on the plate 20 at the top of the compartments. The oil leaving the tray 131 flows into the compartment 133. Any fine particles still remaining in this oil drop to the bottom of the compartment 133. The clear oil flows over the top of the partition 135 into the compartment 134 from which it flows through a return conduit 137 to the sump. The oil is thoroughly strained and is constantly reuseable until a change is necessary.

The machine is used as follows. A rudimentary fastener element is placed in the chuck 39 by inserting its shank 10 in the cavity 40. This is done while the cutters 112 are in operation and the chuck is in its normal position. A pushing force is then applied to the handle 58 which compels the simultaneous axial and turning movement of the screw driver 48. The axial movement toward the work piece occurs somewhat before the turning movement, according to the pattern of the cam 53, in order to provide leeway. The screw driver is engaged with the work piece causing it to move axially a predetermined distance supported by the chuck and guided by the slide 31, and simultaneously therewith, the work piece is turned relatively to the chuck one-fourth of a revolution with the result spiral slots 14 are cut into the work piece. The spring 37 is compressed. By pulling on the handle 58, the screw driver 48 is retracted and at the same time the spring 37 reacts to return the slide 31 and chuck 39 to the normal position, enabling the removal of the finished fastener element from the chuck, said element being dropped to the chute 124 which delivers it to the receptacle 128. These operations are repeated for quantity production. The oil is constantly circulated during the operation of the machine in the manner and for the stated purposes.

In Figs. 17, 19, 21 and 22 are shown a vernier or gage for making and indicating adjustments of the screw driver 48 at the desired angle and distance with respect to the work piece 10 for an accurate setup in the operation of machine. This is desired in order to obtain a definite relation of the inner terminii of the slots 14 with respect to the kerf 13, and the depth of the slots with respect to the head 11, or in other words, the axial travel of the work piece 10 with respect to the cutters 112.

The vernier or gage 140 consists of a collar 141, nut 142 and indicator 143. The collar 141 has a nipple 144 which has a male thread to receive the nut 142 which is tapped correspondingly. The collar carries a thumb screw 145. The circular face of the collar has a scale 146 graduated from zero to 360 degrees. The circular face of the nut has a scale 147 graduated from zero to 50. The nut 142 is knurled to facilitate the turning of the nut on the nipple 144. The collar 141 is arranged on the sleeve 45 which has a longitudinal groove 148 therein. The collar 141 together with the nut 142 carried by the former may be slid back and forth on the sleeve 45. The screw 145 is receivable in the groove 148 and when tightened secures the collar to the sleeve 45. The indicator 143 is secured in fixed position on the clamp bearing 44 by screws 149.

When after an approximate setting of the screw driver 48 it is desired to accurately adjust the angular position of the screw driver on the axis provided by the shaft 47, the parts 141 and 142 are slid on the sleeve 45 to a position in which the nut 142 abuts the bearing 44. The screw 145 is then tightened to lock the collar on the sleeve 45. A reading is then taken as indicated on the scale 146 by the indicator 143. The bolts of the clamp bearing 44 are loosened after which the sleeve 45 and parts carried thereby are turned in the proper direction, thereby changing the angular position of the screw driver 48 to the desired position as indicated by the vernier. The bolts of the bearing 44 are tightened to hold the sleeve 45 and associated parts in the new position. Thus it is possible to obtain a definite relation of the inner terminii of the slots 14 with respect to the kerf 13 when the slots are cut.

With the parts 141 and 142 locked on the sleeve 45 with the nut 142 abutting the bearing 44, the screw driver 48 may be set at the proper distance with regard to the work piece considering its length and the depth of slots 14 desired with respect to the head 11. A reading is then taken as indicated on the scale 147 by the indicator 143. The sleeve 45 is unclamped as aforesaid. The nut 142 is then turned and by reason of its threaded engagement with the nipple 144 and contact with the bearing 44 the sleeve 45 and parts carried thereby, including the screw driver 48, may be moved axially to the desired accurately adjusted position indicated on the vernier scale 147 by the indicator 143. The sleeve 45 is then clamped by tightening the bolts of the bearing 44.

In Fig. 17 are shown dotted lines a, b, c and d. The line a indicates the center of the cutters 112. The distance between the lines a and b indicates the degree of axial movement of the screw driver 48. The line c indicates the starting position of the edge of the screw driver. The distance between lines c and d indicates the amount of axial adjustment of the screw driver required to operate properly on the longer fastener element shown in Fig. 18, and in which adjustment the final and accurate setting is accomplished by the use of the vernier for the purposes stated.

The machine may be set or supported in any suitable manner at the desired elevation. In the present instance, the machine is set on a stand 138 which has various compartments and places for finished and unfinished work, tools and other accessories.

It is to be understood the invention is not restricted to the illustrated embodiment thereof, but that changes may be resorted to and details of construction may be modified and rearranged in accordance with the appended claims.

I claim:

1. In a machine tool, a stationary support, an axially movable spindle assembly mounted in said support, a rotary hollow shaft extending in a transverse bore in said support, said assembly having a gear rack, a gear on said shaft meshing with said rack, a clamping bolt extending through said shaft, a nut fixed to said support in threaded engagement with the inner end of said bolt, said support embodying a clamping portion, means on the shaft operable to rotate said shaft to move the spindle between an advanced position and a retracted position through the intervention of said rack and gear, and means on said bolt operable to turn said bolt to exert pressure on said clamping portion to clamp the spindle in position.

2. In a machine tool as set forth in claim 1, and a separate actuator which may be optionally used with said means on the shaft to rotate the shaft, or used with said means on the bolt to turn the bolt.

3. In a machine tool, a spindle, means mounting the spindle for axial movement between an advanced active position and a retracted inactive position enabling the insertion and removal of a tool, means for driving the spindle, and means adapted to cooperate with a part of the driving means when the spindle is in its retracted position to prevent the rotation of the spindle, said part having holes therein, and said last means consisting of a fixed support, a stop pin slidable in said support and receivable in any one of said holes, and a spring in set relation to said pin to yieldingly bear on one end of said pin to hold it in the selected hole.

4. In a machine tool, a spindle, means mounting the spindle for axial movement between an advanced active position and a retracted inactive position enabling the insertion and removal of a tool, a pulley fast on said spindle for driving it, said pulley having a circular series of spaced holes therein, a fixed support, a stop pin movable back and forth in said support, said pin being receivable in any one of said holes when the spindle is in its retracted position to prevent the rotation of the spindle, and a spring on said support which yieldingly bears on one end of said pin to hold it in the selected hole.

WILLIAM DZUS.

REFERENCES CITED

The following references are of record in the file of this patent:

UNITED STATES PATENTS

| Number | Name | Date |
| --- | --- | --- |
| 1,616,151 | Thacher | Feb. 1, 1927 |
| 1,630,328 | Brumbach | May 31, 1927 |
| 1,697,698 | Sundstrand | Jan. 1, 1929 |
| 1,991,500 | Eklind | Feb. 19, 1935 |
| 2,016,365 | Dumser et al. | Oct. 8, 1935 |
| 2,026,448 | Turrettini | Dec. 31, 1935 |
| 2,038,235 | Phillips | Apr. 21, 1936 |
| 2,109,969 | Dzus | Mar. 1, 1938 |
| 2,153,424 | MacRae | Apr. 4, 1939 |
| 2,178,130 | Zwick | Oct. 31, 1939 |
| 2,227,620 | Armitage et al. | Jan. 7, 1941 |
| 2,290,061 | Matia | July 14, 1942 |
| 2,366,247 | Fauser | Jan. 2, 1945 |